G. W. FLEMING.
MILLING ATTACHMENT FOR LATHES.
APPLICATION FILED JAN. 8, 1912.
1,125,285.
Patented Jan. 19, 1915.
3 SHEETS—SHEET 1.
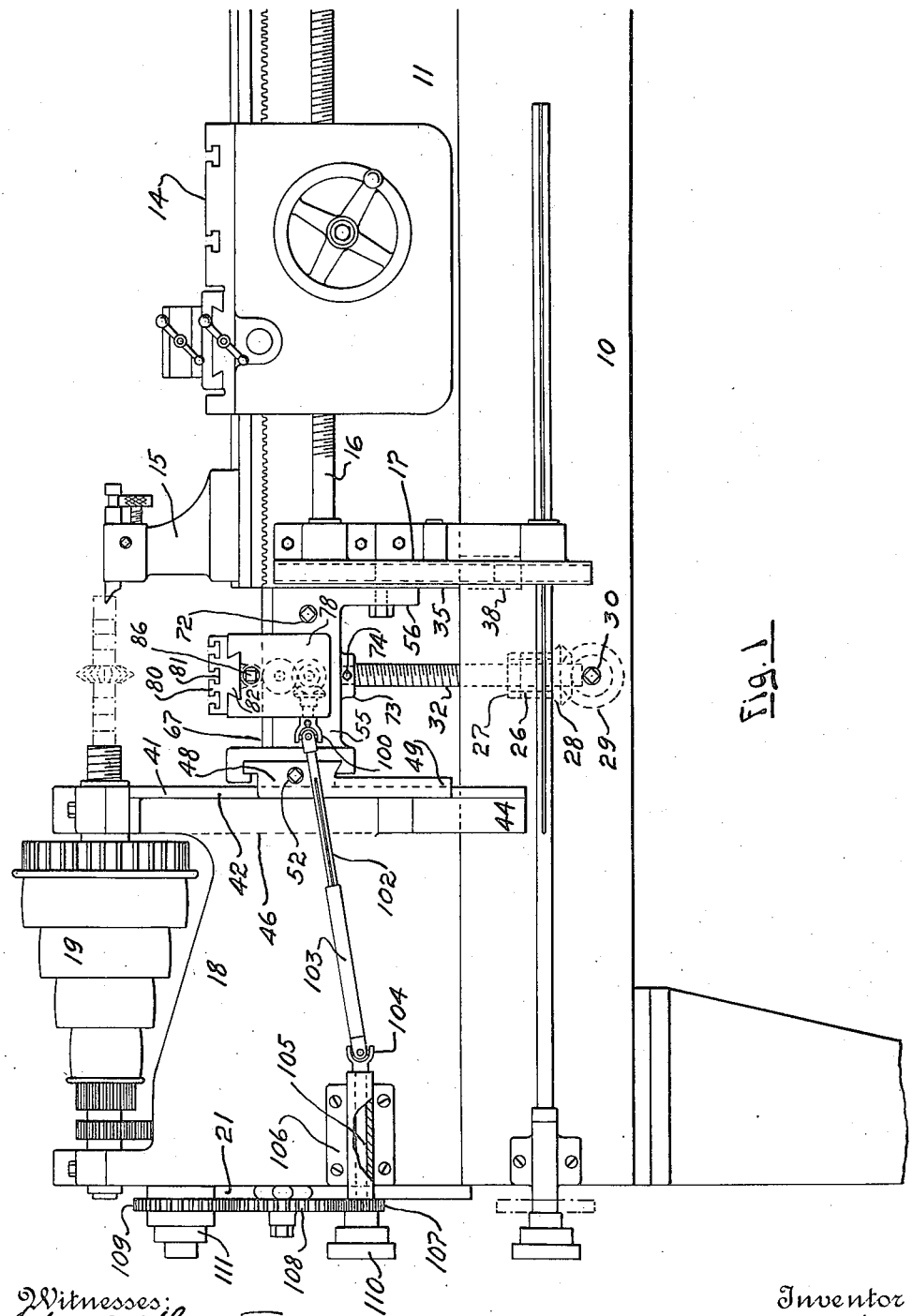
Witnesses:
John A. Hagerstrom
Wm. R. Ackerman
Inventor
George W. Fleming
By his Attorney
H. C. Karlson

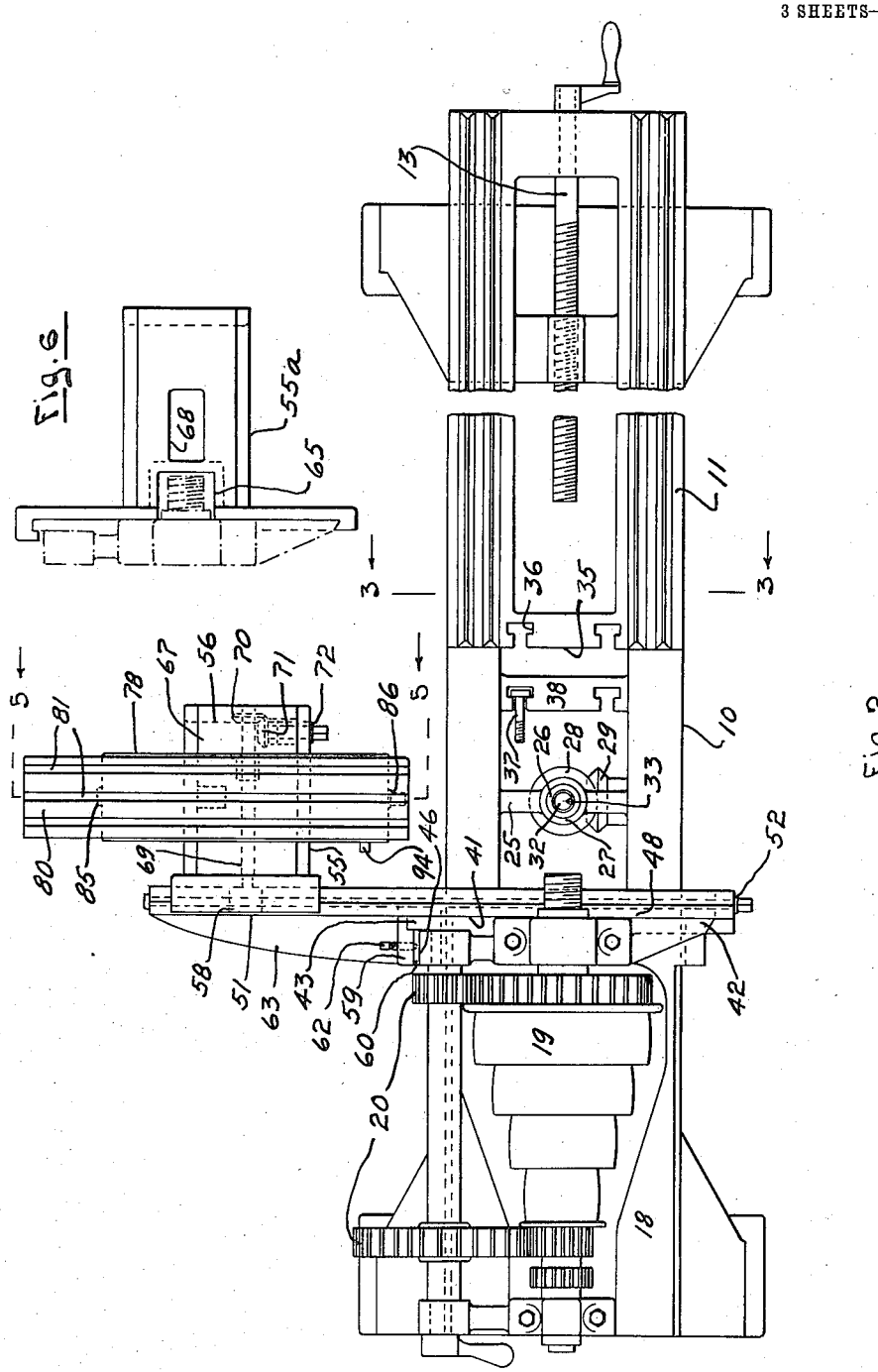

G. W. FLEMING.
MILLING ATTACHMENT FOR LATHES.
APPLICATION FILED JAN. 8, 1912.
1,125,285.
Patented Jan. 19, 1915.
3 SHEETS—SHEET 3.
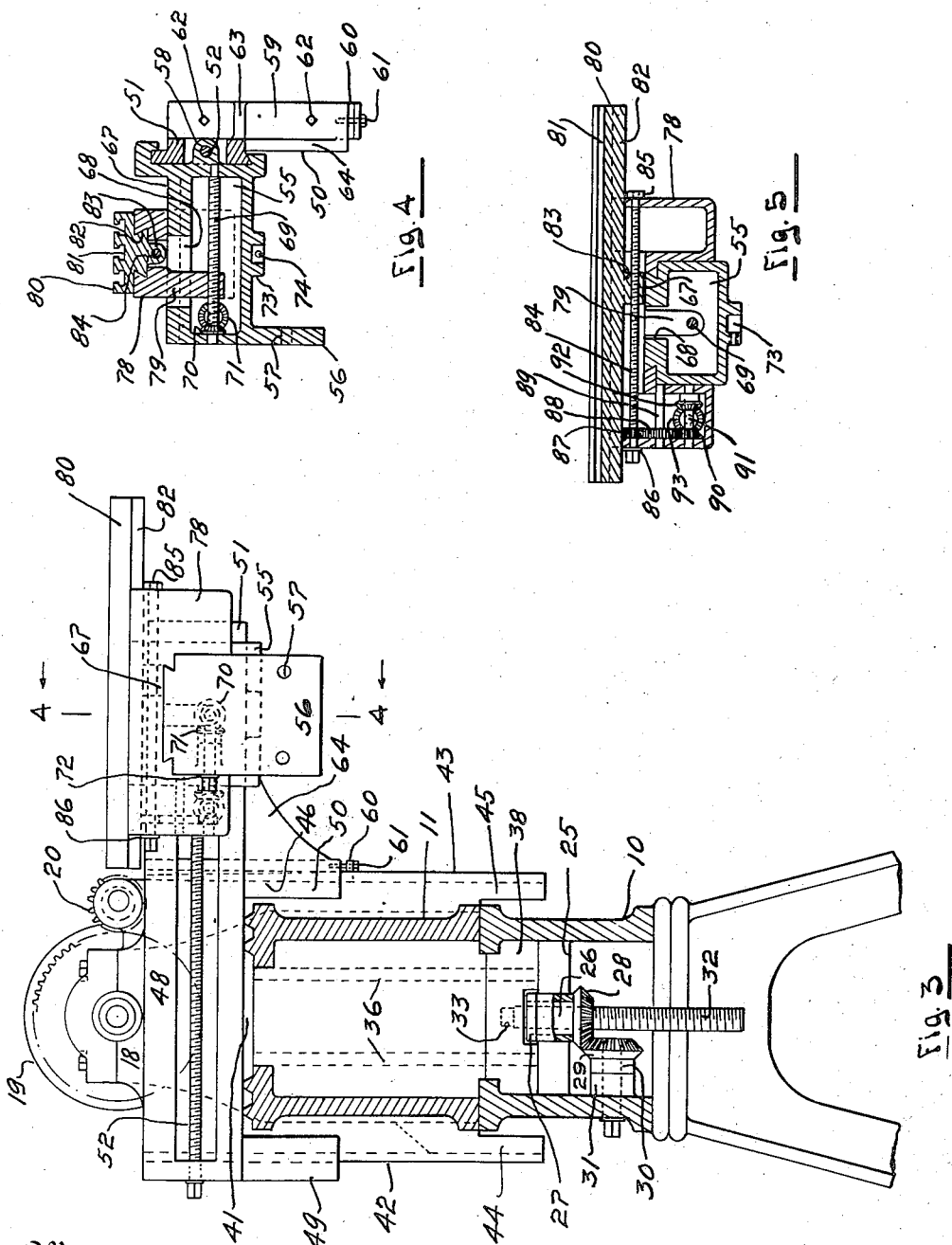

UNITED STATES PATENT OFFICE.

GEORGE W. FLEMING, OF WOODHAVEN, NEW YORK.

MILLING ATTACHMENT FOR LATHES.

1,125,285.     Specification of Letters Patent.    Patented Jan. 19, 1915.

Application filed January 8, 1912. Serial No. 670,021.

*To all whom it may concern:*

Be it known that I, GEORGE W. FLEMING, a citizen of the United States, and resident of Woodhaven, borough of Queens, in the county of Queens and State of New York, have invented certain new and useful Improvements in Milling Attachments for Lathes, of which the following is a specification.

This invention relates to a milling attachment for lathes and particularly to the type thereof termed gap-lathes.

The combination of lathe and milling machine has not as a general rule found the favor it deserves. This is to a great extent depending upon the limited range of height adjustment between the cutting tool and the work support. The designs of milling attachments for lathes heretofore attempted with the purpose of obviating this defect have resulted in cumbersome devices, overhanging the lathe-bed either end or sidewise, and which by the very nature of their construction it has been impossible to rigidly support. Besides they have been inexpedient on account of the necessity of removing them from the lathe proper so as not to obstruct the operator when using this machine-tool without the milling attachment. Also by the substitution of special parts for the standard ones or by changing the location of the latter considerable loss of time has resulted, so much so as to render such attachments of doubtful value.

The design of the present invention is to produce a milling attachment for lathes which will avoid the hereinbefore stated objections. In the device under consideration, the conventional or standard parts of the lathe remain the same and they are maintained in their relative positions. The cutting tool and the work-holder, which are carried centrally of the lathe bed, have been given a wider range of adjustability than has hitherto been accomplished. These parts are firmly supported at both their ends, the work-support being adapted for clamping endwise so as to obtain the maximum rigidity. Moreover, there are no separate parts to be detached when it is desired to employ the lathe for turning or thread-cutting. By the simple expediency of placing the milling attachment in an inoperative position, the same will in no way interfere with the functions of the lathe. Furthermore, the features inherent in this invention of associating the feed of the work-support synchronously with the rotation of the lathe spindle, utilizing the identical change gear system of the lathe without in any way adding complications, is of utmost importance.

To these ends the invention comprises a gap-lathe including the ordinary lower bed or supporting member and a top bed or sliding member movable upon the former, the said slidable member carrying thereon the carriage with its appurtenances and the tail stock belonging to the lathe. These parts are left undisturbed when the top member is moved endwise on the lower or stationary bed. On the latter is fixed the head-stock, which is of suitable height to accommodate work supported between the centers of the lathe, and the live center of which is obviously disposed at a greater distance from the lower bed than it is relatively to the slidable one. The said head-stock is provided at its inner end with guideways, on which is slidably mounted a cross-rail carrying between it and the front end of the slidable bed a member or knee-bracket. This bracket can be moved transversely of the lathe-shears out of the way so as to permit the upper bed member to close the gap or opening between it and the head-stock. The said knee-bracket is slidable upon the cross-rail which extends rearwardly of the lathe for a specified distance. Longitudinally translatable on the knee-bracket is the saddle that carries the transversely movable plate or table to which the work operated upon is held. The feed mechanism of this table is operatively connected up with the change gears, otherwise used in conjunction with the carriage of the lathe. The cross-rail with the knee-bracket and the thereupon mounted saddle with work table are conjointly raised or lowered by a centrally operating screw, the support of which is fixed relatively to the lower bed-member.

In the drawings illustrating the invention:—Figure 1 is a front view of the milling attachment operatively applied to a gap-lathe with parts of the lathe omitted. Fig.

2 is a plan view of Fig. 1 with some of the elements in a changed position and others omitted. Fig. 3 is a section on the line 3—3 of Fig. 2. Fig. 4 is a section on the line 4—4 of Fig. 3. Fig. 5 is a section on the line 5—5 of Fig. 2, and Fig. 6 is a plan view of a modified form of one of the elements of the milling attachment.

All sections are taken in the direction of the arrows.

In the said drawings, the numeral 10 represents the lower or stationary bed member and 11 the upper member or extension bed movable on the lower bed by means of the endwise acting screw 13 (Fig. 2). The carriage and tail-stock or tail center, respectively 14 and 15 (Fig. 1) are mounted on the ways of the said upper bed member 11, as is also the lead screw 16 and the bearing bracket 17 containing the actuating gearing for said carriage 14. Opposite to the extension bed is the head-stock 18 with the cone-pulley, back gearing and change-gears carrying swing-plate, respectively 19, 20 and 21. The hereinbefore enumerated elements constitute the standard or conventional parts of a gap-extension lathe.

A bracket 25 bridging the space between the side walls of the lower stationary bed 10 is arranged to rotatably receive an internally threaded sleeve 26. The latter is held in axial alinement by a collar 27 engaging its upper necked extremity, and at the lower end thereof by the rear portion of a gear 28 which is formed integrally therewith. The said gear 28 is in meshing engagement with a coacting gear 29 carried at the inner end of a spindle 30 that is revolubly supported in a bearing 31 formed with one side of the said bed 10. The outer end of the spindle 30 is provided with a square shank for the reception of a suitable wrench or crank. An elevating screw 32, which is in threaded engagement with the said sleeve 26, has its upper reduced end provided with a seat 33, the purpose of which will be hereinafter referred to.

The front end of the extension bed 11 is provided with a bearing face 35 and with T-formed slots or grooves 36 adapted to receive the heads of clamping bolts, one of which is shown at 37 (Fig. 2). The said slots 36 are continued downwardly through a bridge piece 38 spanning the inner sides of the walls of the lower bed member. This bridge piece is located a specified distance from the head stock and the object thereof, as well as that of the T-bolts, will be hereinafter described.

The work-supporting or head end of the head stock 18 is provided with an up-and-down extending guide 41, consisting preferably of an integrally formed bearing face (41) having laterally projecting flange portions 42, 43, reinforced at their lower extremities by depending lugs 44, 45 respectively.

A cross-rail 48 having extension guides 49, 50 is in slidable engagement with the guide 41. On the said cross-rail 48 is slidably mounted a knee member or bracket 55 having a basal flange 56 provided with clearance holes 57 adapted to receive the hereinbefore mentioned bolts 37, by means of which the knee-bracket can be rigidly clamped endwise to the face 35 of the upper bed 11 or to the bridge piece 38, depending upon the elevation at which it is desired to locate said knee-bracket. This knee-bracket may be moved upon a rearwardly extending portion 51 of the cross-rail 48 transversely of either of the bed members by a screw 52 engaging a fixed nut 58 formed with the bracket 55. By virtue of which the said knee-bracket can be moved entirely out of the way of the upper or slidable extension bed 11. This is accomplished by applying a suitable wrench or crank to the squared outer end of the said screw 52.

To afford the overhanging end 51 of the cross-rail 48 lateral rigidity, a flange 59 is constructed to take over the far side portion 43 of the guide 41. The broadened face of the said flange 59 is disposed opposite to a guideway 46 located right-angularly relative to the said front guide 41 at the rear of the head-stock 18. A tapered gib 60, interposed between the flange 59 and the said guideway 46, is operatively maintained by an adjusting screw 61 engaging the lower end of the said flange 59. Clamping screws 62, which also are in threaded engagement with the latter, at the rear side thereof, may be brought to bear upon the gib 60 so as to frictionally sustain the weight of the cross-rail 48 in its top position when the elevating screw 32 is receded (Fig. 3). A rib 63 extending horizontally between the said flange 59 and the outer end of the cross-rail 48, as well as a web 64 reaching vertically from the under side of the overhanging portion 51 of the said cross-rail 48 to the rear extension 50 of the latter, contribute to increase its stiffness.

The body of the knee member 55 is preferably of box formation so as to give maximum rigidity and to receive mechanism by means of which a saddle 78 slidably engaging the top face 67 is translatable on V-guides thereof. Said mechanism is composed in its simplest form of a screw 69 rotatably supported in the end walls bounding the body of the knee-bracket. The said screw 69 is in threaded engagement with a lug 79 operating through an elongated opening 68 in the said top bearing face 67 and fixed to the saddle 78. A gear 70, fastened to one end of the screw 69, has its teeth in mesh with the teeth of a coacting gear 71 fixedly carried at the inner end of a spindle 72 which is journaled in the front wall of the knee body and provided at its outer end with a square shank adapted to take a suitable operating handle. The bottom wall of the knee box body is formed with a socket 73 for the reception of the upper reduced end of the elevating screw 32, and a set screw 74 threaded into the side wall of this socket is adapted to coöperate with the seat 33 in the said screw 32 to hold the latter from rotating.

The saddle 78, which, as hereinbefore stated, is slidably supported by the top face of the knee-bracket 55, is further arranged to straddle the latter so as to obtain an additional bearing guide on both of its longitudinal sides. A table 80, provided with a series of T-slots 81 to hold the work operated upon and having a dove-tailed guide 82, is slidably mounted in a correspondingly formed recess in the said saddle 78.

Mechanism for translating the work table 80 transversely relatively to the knee-bracket 55 is contained within the saddle 78 and comprises a fixed nut 83 depending from the underside of the dove-tailed guide 82 (Fig. 5).

A screw 84, having threaded engagement with the said nut 83, is journaled in the end walls of the saddle 78, being held axially at one end by a collar 85 and at the other by a squared shank 86 adapted for manual operation by a suitable wrench or handle. Near one end of the said screw 84 is secured a pinion 87, which is in meshing engagement with an intermediate gear 88 mounted on a spindle 89 also journaled in the end walls of the saddle 78. The said gear 88 engages a pinion 90, which is fastened near one end on a spindle 91 similarly journaled in the same saddle end walls. The teeth of a bevel gear 92, which latter is fastened to the said spindle 91 near the other end thereof, are in mesh with the teeth of a coacting bevel gear 93 secured to the inner end of a spindle 94 journaled in the front side wall of the saddle 78. The form of mechanism just described for feeding the work table is eminently adapted to accomplish the purpose in view, although it is obvious that many modifications thereof or substitutes therefor within the scope of the claims can be resorted to if desired. The outer end of the said spindle 94 which projects beyond the saddle (Fig. 2) is adapted to receive the hub of a universal coupling 100 that may be held thereto by a set-screw or other suitable means. A telescopic shaft and spline, respectively, 102 and 103, together with another universal coupling 104, constitute a flexible drive for the work table 80 through the hereinbefore enumerated elements, namely, the gears 93, 92, 90, 88, 87 and the screw 84, by virtue of which the said table 80 can be actuated in any of the operative positions of the knee-bracket 55, the therewith coöperating saddle 78 and the table 80, which jointly or singly serve the purpose of a work carrier. The said latter coupling 104 is attached to the end of a short shaft 105 which has its bearing in a bracket 106 bolted to the side of the head-stock 18. The other end of this shaft 105 is adapted to receive a gear 107, which belongs to the nest of change gears of the lathe, the coacting gears 108 and 109 being supported from the swing-plate 21 and the head-stock 18 respectively. It is obvious from the foregoing that the work-carrying table can be given a movement synchronous with that of the lathe spindle and predetermined by the ratio of change gears selected without the addition of extra parts for obtaining these results. The said shaft 105 carries also at its outer end a step cone pulley 110 arranged to coöperate with a cone-pulley 111 operatively carried from the head-stock 18. This latter drive is generally employed when it is only required to feed the work under the rotating cutter without synchronizing its movement with the lathe-spindle as a positive drive by gears would do.

The modification of the knee-bracket 55ª illustrated in Fig. 6 comprises a combination of cross-rail and knee-bracket which possesses the same features as that of the previously described construction, with the exception that it is only movable vertically on the head-stock guide. To provide for removal of the knee-bracket 55ª, the latter has formed therewith an opening or gap 65 extending all the way through the same, top and bottom, so as to clear the lathe spindle, which permits removal thereof topwise from the guide.

In operating the device as a lathe, the work table and saddle carrying knee-bracket 55 are disposed in their outboard position, illustrated by Figs. 2 and 3. When it is desired to place this knee-bracket in its operative position, the upper or extension bed 11 is moved endwise away from the head-stock 18 by means of the screw 13 so as to open the gap sufficiently between these parts to allow the said knee-bracket to be slid upon the cross-rail 48 until the bolt holes 57 in the flange 56 of the knee-bracket come opposite the T-slots 36 ready to take over the clamping bolts 37. The elevating screw 32 is then run up until its upper reduced end enters the socket 73 on the underside of the knee-bracket, whereafter the set-screw 74 is brought to bear in the seat 33 of the elevating screw. Next the universal coupling 100 is fastened in place at the end of the spindle 94. After selecting the proper gears to go on the end of the short shaft 105, or utilizing a belt drive between the cone pulleys 110 and 111, the milling attachment is ready to be operated, when the cutter to be used has been rigged up on its arbor between the end of the head-stock spindle and the tail-center 15. The depth of cut to be taken is regulated by operating the geared spindle 30 by means of which the knee-bracket is raised or lowered, after which the bolts 37 are tightened to firmly hold the said bracket 55 in position. To move the saddle 78 lengthwise on the knee-bracket, the spindle 72 is manipulated, and by applying power manually at the shank 86 the screw 84 is operated to move the table 80 transversely relatively to the knee-bracket or lathe beds. From the foregoing, it is obvious that the parts can be as readily disconnected for the purpose of placing the milling attachment in its inoperative position again.

While I have shown and described certain embodiments of my invention, it will be understood that other changes in form, arrangement, sizes, proportions and details, may be made without departing from the scope of the invention as defined by the appended claims.

Having described my invention, what I desire to secure by Letters Patent and claim is:—

1. In a milling attachment for a lathe, the combination with the lathe-bed and a head-stock mounted thereon; said head-stock operatively carrying a tool and being provided with a guide, of a cross-rail slidably mounted in a vertical plane on said guide, a carrying bracket supported from both ends and slidable on said cross-rail transversely of the lathe-bed, a work table mounted to slide on said saddle transversely relatively to both the lathe-bed and the bracket, and means to raise and lower said bracket together with said cross-rail, said saddle and said table with respect to the lathe-bed, whereby work held to the table is brought in position for proper cutting depth of the tool.

2. In a milling attachment for lathes, the combination with a lower bed and a head-stock thereon, of an upper bed slidable on said lower bed, a work-carrier having its support in the gap between said head-stock and said upper bed, and a screw carried fixedly relatively to the lower bed for raising and lowering said work-carrier, said screw being adapted to recede so as to allow the upper bed to pass thereover.

3. In a milling attachment for gap-lathes, the combination with a head-stock, of a work-carrier adapted for operation in the gap of the lathe engaging both sides of said gap, and means connecting said head-stock with said carrier enabling the latter to be conveyed out of the gap to permit closing the latter.

4. In a milling attachment for lathes, the combination with a head-stock and a guide thereon, of a cross-rail slidably mounted on said guide having an extension projecting laterally of the head-stock, and a work-carrier movable centrally of the lathe-bed on said cross-rail and rearwardly thereof on the extension.

5. In a milling attachment for gap-lathes, the combination with a head-stock and a tool connected therewith, said head-stock having a guide about the face end thereof, of a cross-rail slidably mounted on said guide and having an extension projecting outwardly therefrom beyond the lathe-bed, and a work-carrier movable on said cross-rail and its extension to enter the gap of the lathe for operatively holding the work to the tool or to be transferred from the gap into an inoperative position outside the bed of the lathe.

6. In a milling attachment for gap-lathes, the combination with a work-carrier adjustably engaging both ends of the gap in the lathe, mechanism for feeding the work-carrier transversely while in the gap, change gearing common to the lathe and to the work-carrier, and flexible means transmitting motion from said change gearing to said feeding mechanism.

7. In a milling attachment for lathes, the combination with a lower bed and a head-stock thereon, of a slidable member on said lower bed having a bearing face provided with a fastener-receiving means, a work-carrier adjustably supported between the head-stock and the sliding member adapted to have one end in engagement with said bearing face, and a fastening means coacting with said receiving means to hold the work-carrier endwise.

8. In a milling attachment for gap-lathes, the combination with a lower bed and a head-stock thereon, of a sliding bed on said lower bed having a slot in the inner end thereof, a work-carrier adjustably supported in the gap of the lathe between the head-stock and said end of the sliding bed, a bridge spanning the interior of said lower bed having a slot adapted to register with the slot in the sliding bed, and a bolt with said carrier coöperating with either of said slots.

9. A gap-lathe comprising a lower bed, a head-stock thereon, an upper bed slidable on said lower bed toward and away from the head-stock, and a tool held between the head-stock and said upper bed, combined with a work-carrier adapted for insertion and operation in the gap of the lathe, and means whereby the said attachment can be transferred out of said gap to leave the lathe available for ordinary functions.

10. In a milling attachment for gap-lathes, the combination with a lower bed and a head-stock thereon having a guide arranged front-wise, of an upper bed slidable on said lower bed, a work-carrier having slidable engagement with said guide, bearing thereon and upon the opposite end of the sliding bed when in an operative position, and means for adjustably supporting said carrier, the latter being movable into inoperative position to permit closing the gap by said sliding bed.

Signed at the borough of Manhattan in the county of New York and State of New York this 5th day of January A. D. 1912.

GEORGE W. FLEMING.

Witnesses:
H. C. KARLSON,
W. H. GEE.